United States Patent [19]

Maruko

[11] 4,439,020
[45] Mar. 27, 1984

[54] SUNRAYS FOCUSING APPARATUS

[75] Inventor: Saburo Maruko, Yamato, Japan

[73] Assignee: Nihon Chemical Plant Consultant Co., Ltd., Tokyo, Japan

[21] Appl. No.: 347,338

[22] Filed: Feb. 9, 1982

[30] Foreign Application Priority Data

Feb. 13, 1981 [JP] Japan .................................. 56-18927

[51] Int. Cl.³ ............................................ G02B 17/18
[52] U.S. Cl. .................................. 350/443; 350/294; 350/504; 353/3; 126/440
[58] Field of Search ............... 350/443, 294, 504, 433; 353/3; 126/438, 440

[56] References Cited

U.S. PATENT DOCUMENTS 3,118,437 1/1964 Hunt .................................. 350/294
4,395,095 7/1983 Horton ............................... 350/504

FOREIGN PATENT DOCUMENTS 56-50173 11/1981 Japan .

Primary Examiner—Jon W. Henry
Attorney, Agent, or Firm—Armstrong, Nikaido, Marmelstein & Kubovcik

[57] ABSTRACT

A sunrays focusing apparatus for obtaining highly condensed solar energy. The apparatus includes a first trough-shaped parabolic reflector mounted for rotation about both vertical and horizontal axes.

A first elongated refractor is mounted to the first parabolic reflector along or adjacent to the focal axis of the first parabolic reflector.

A second trough-shaped parabolic reflector is also mounted to the first parabolic reflector in such a way that focal axes of both first and second parabolic reflectors are disposed at right angles to each other.

A second reflector is mounted to the first parabolic reflector along or adjacent to the focal axis of the second parabolic reflector. Mounted on the second parabolic reflector is a sun tracking device responsive to sunrays for directing the first parabolic reflector towards the sun.

5 Claims, 14 Drawing Figures

SUNRAYS FOCUSING APPARATUS

BACKGROUND OF THE INVENTION

This invention relates to a sunrays focusing apparatus for focusing sunrays and taking out them in the form of focalized parallel beams.

The most important points to be considered in utilizing the solar energy such as solar heat are how to manufacture the focusing system cheaper because of the low energy density of the sunrays and how to reduce the focusing area relative to the sunrays receiving area; that is to say, how to focus sunrays to increase the density of energy available.

A great many systems for utilizing solar heat have heretofore been developed; however, most of them were disadvantageous in that they cannot provide sufficient sunrays focusing density and are complicated in construction and expensive for commercial use.

SUMMARY OF THE INVENTION

It is therefore an object of the present invention to prdvide a sunrays focusing apparatus which is simple in construction and inexpensive to manufacture.

Another object of the present invention is to provide a sunrays focusing apparatus which can condense sunrays to a very high density.

In accordance with an aspect of the present invention, there is provided a sunrays focusing apparatus, comprising in combination: a first vertical shaft; a support frame rotatably mounted on said first vertical shaft; first drive means for rotating said support frame around said first vertical shaft; horizontal shaft means rotatably supported on said support frame; second drive means for rotating said horizontal shaft means; a first trough-shaped parabolic reflector means fixedly secured to said horizontal shaft means for reflecting incoming sunrays; first elongated refractor means mounted to said first reflector means at or adjacent to a focal axis of said first reflector means, said first elongated refractor means being adapted to refract sunrays reflected by said first parabolic reflector means into parallel sunrays; second trough-shaped parabolic reflector means mounted to said first parabolic reflector means in such a way that focal axes of both said first and second parabolic reflector means are disposed at right angles to each other; second refractor means mounted to said first parabolic reflector means at or adjacent to the focal axis of said second parabolic reflector means for refracting sunrays reflected by said second parabolic reflector means into highly condensed parallel sunrays; and sun tracking means responsive to sunrays for directing said first parabolic reflector means to the sun by controlling said first and second drive means.

The above and other objects, features and advantages of the present invention will be readily apparent from the following description taken in conjunction with the accompanying drawings.

DESCRIPTION OF THE PREFERRED EMBODIMENT

The present invention will now be described in detail with reference to the accompanying drawings.

Figure 1:
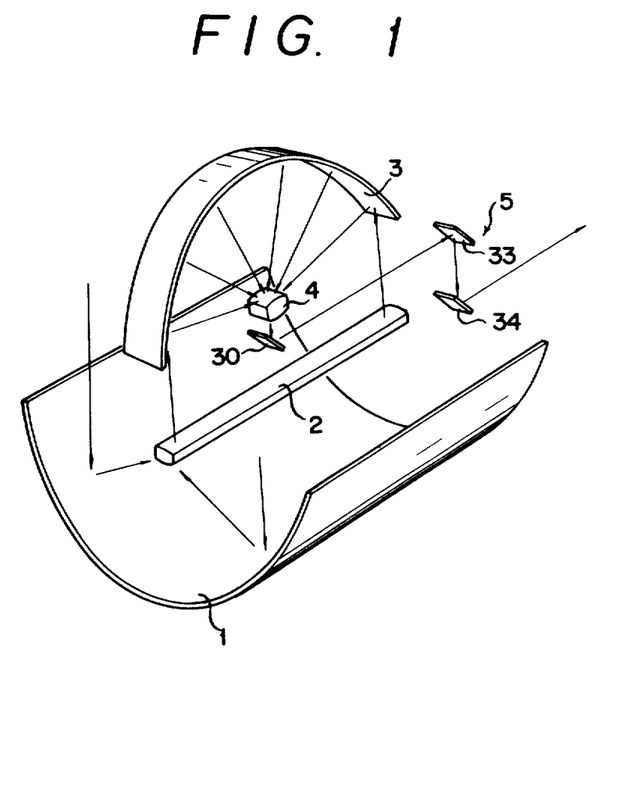
FIG. 1 is a view schematically showing a fundamental construction of the present invention.

FIG. 1 shows schematically the construction of a sunrays focusing apparatus according to the present invention. In this drawing, reference numeral 1 denotes a first parabolic trough-shaped reflector assembly, 2 first refractors or lenses located in the vicinity of the focus of the first reflector assembly, and 3 a second parabolic trough-shaped reflector assembly formed in the similar configuration to that of the first reflector assembly. Reference numeral 4 indicates a second refractor or lens located near the focus of the second reflector assembly, and 5 an array of flat or plane reflectors forming light beam reflection paths.

Thus, the sunrays impinging on the first reflector assembly 1 are reflected thereby and focused in the vicinity of the focus thereof in the form of a strip in the direction of the width. The resultant first focused sunrays are refracted by the first refractors or lenses 3 and changed in the form of belt or strip-shaped parallel rays which impinge against the second reflector assembly 3. Thus, the sunrays are reflected again by the second reflector assembly 3 and focused near the focus thereof. The sunbeams focused in the form of a dot are then refracted by the second refractor or lens 4 and converted in the form of parallel light beams which are taken out through the reflection by the array of plane reflectors 5.

The above-mentioned apparatus is adapted to track or follow the sun completely and the first reflector assembly 1 is arranged to face the sun at all times.

The detailed description of the aforementioned sunrays focusing apparatus according to the present invention will now be made with reference to FIGS. 2 to 11.

Figures 2, 3:
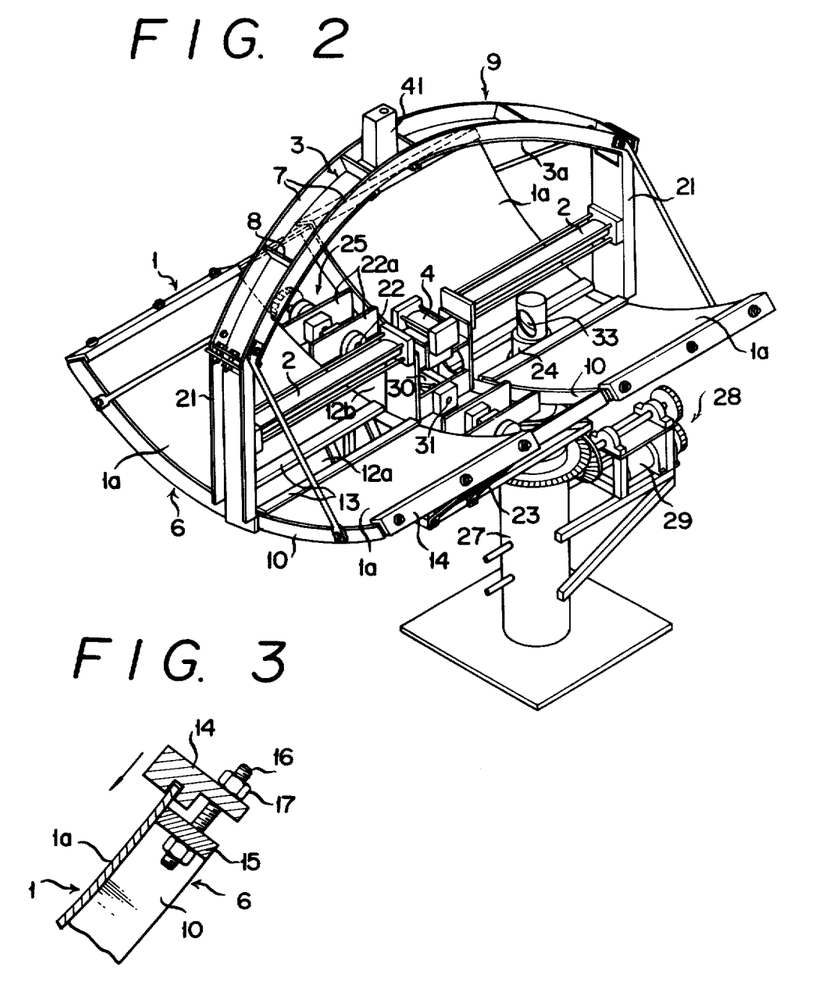
FIG. 2 is a perspective view of a sunrays focusing apparatus according to the present invention.
FIG. 3 is a fragmented cross-sectional view showing the mounting detail of a plate mirror to a framework.

With reference to FIG. 2, the first reflector assembly 1 is formed, as aforementioned, by a trough-shaped paraboloid. Stating in more detail, the first reflector assembly 1 comprises a grid shaped framework 6 formed by a plurality of parabolic-shaped ribs 10 and spacers 11, and plate mirrors 1a mounted on the framework 6. The above-mentioned ribs 10 can be formed, for example, by allowing a pipe material to subject to bulging work (which comprises the steps of axially compressing a pipe located in a parabolic-shaped mold and applying a hydraulic pressure to the inside of the pipe thereby bulging the pipe).

Since a vertical rotary shaft 24 which will be mentioned in detail later extends through the first reflector assembly 1 as shown in FIGS. 2, 4, 5 and 6 and provision of spacing is required for taking out the sunbeams reflected by the second reflector assembly 3, the plate mirrors 1a consist of four sections excluding the area through which the vertical rotary shaft 24 extends, and strip-shaped spaces 12a and 12b extending at right angles to each other are formed between the four plate mirrors 1a constituting the first reflector assembly 1.

Installed on both sides of the axially extending space 12a of the first reflector assembly 1 are plate mirror retainers 13, respectively, in which one side edge of each plate mirror 1a is inserted and fixedly secured. The other side edge of the plate mirror 1a is fixed by a screwing means 14 as shown in FIG. 3.

The screwing means 14 is adapted to be fixedly secured to the plate mirror 1a by tightening up a nut 17 threadably engaged with a bolt 16 passing through a support member 15 fitted to one end of the rib 10. Stating in brief, the nuts 17 engaged with the bolt 16 are loosened to obtain a sufficient spacing between the support member 15 and the screwing means 14 and each of the plate mirrors 1a is inserted in the slot of the screwing means 14 and then the nut 17 is tightened up. By so doing, the plate mirror 1a is fixedly secured between the plate mirror retainer 13 and the slot of the screwing means 14. At that time, the plate mirror 1a is urged by the sides of the retainer 13 and the screwing means 14 along the parabolic face of the ribs 10.

The first refractors or lenses 2 are mounted in the vicinity of the focus of the first reflector assembly 1 to refract the sunrays and convert them into parallel rays. The first refractors 2 are divided into two sections in the axial direction of the first reflector 1 and each of the divided portions is located opposite to each of the plate mirrors 1a.

As for each of the first refractors 2, a concave lens is used where it is to be located at a position nearer to the first reflector assembly 1 than the focus thereof, a combination of a fish-eye lens and a concave lens is used where it is to be located at the focus of the first reflector assembly 1; and a convex lens is used where it is to be located farther than the focal length of the first reflector assembly. In either case, each of the first refractors 2 is adapted to refract the sunrays reflected by the first reflector assembly 1 and axially focused in the strip shape and directs them upwards and at right angles to the direction of the focal axis of the first reflector assembly 1. Further, as for such a refractor lens, biconvex lens is easier to manufacture and is convenient to make its inside hollow to allow cooling water to flow therethrough.

Figure 7:
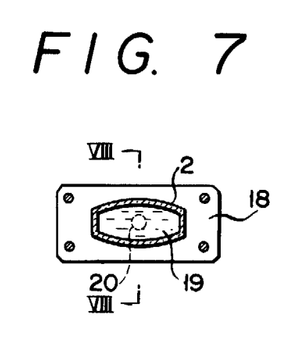
FIG. 7 is a cross-sectional view of a refractor.
Figure 8:
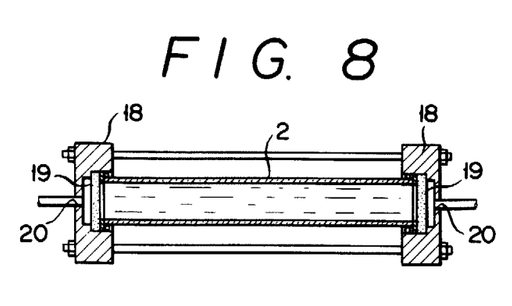
FIG. 8 is a cross-sectional view taken along the line VIII—VIII of FIG. 7.

FIGS. 7 and 8 show one embodiment of the first refractor or lens 2 comprising a biconvex lens. In this embodiment, the refractor is comprised of a hollow transparent member having a length corresponding to the width of the plate mirror 1a and having biconvex sectional shape, and also having metal retainers 18, 18 fixed at both ends of the opening thereof. The metal retainers 18, 18 are attached to brackets projecting from frameworks 6 of the first reflector assembly 1 as shown in FIG. 2. Each of the first refractors 2 is closed at both ends thereof by a dispersion plate 19 of a porous material having, for example, pores of 20μ, such as sintered metals. Further, a fluid communication port 20 is formed in each of the metal retainers 18 and outside of each dispersion plate 19.

The second reflector assembly 3 is formed, as shown in FIG. 2, by two mirror sections forming a parabolic trough-shaped configuration. Stated in more detail, the second reflector assembly 3 is comprised of a framework 9 formed by ribs 7 and spacers 8 and plate mirrors 3a attached to the framework 9. The second reflector assembly 3 is supported at both ends thereof through brackets 21, 21 by the framework 6 of the first reflector assembly 1 in such a way that focal axes of both reflector assemblies are disposed at right angles to each other. In brief, movement of the second reflector assembly 3 is interlocked with that of the first reflector assembly 1. Located near the focal axis of the second reflector assembly 3 and between the first refractors 2, 2 is a second refractor or lens 4 which is identical in construction to the first refractors 2 except that it is different in length.

On both sides of a plane extending at right angles to the focal axis and crossing the same at an intermediate point, horizontal rotary shafts 22, 22 are each fixedly secured to brackets 22a which are in turn fixedly secured to the framework 6 of the first reflector assembly 1. The horizontal rotary shafts 22, 22 are rotatably carried at both ends thereof by a support frame 23 through bearings 22b. A servo-motor 26 is mounted on the support frame 23. The servo-motor 26 is connected through a gear train 25 with one of the horizontal rotary shafts 22, 22 so that the horizontal shafts 22, 22 may be rotated by the rotation of the servo-motor 26 and the first and second reflector assemblies 1 and 3 can be tilted as a single unit about the horizontal rotary shafts 22, 22.

A vertical rotary shaft 24 to which the support frame 23 is fixedly secured is rotatably carried by a vertical stationary shaft 27. A servo-motor 29 is mounted on the vertical stationary shaft 27. The servo-motor 29 is connected through a gear train 28 with the vertical rotary shaft 24 so that the first and second reflector assemblies 1, 3 and the first and second refractors 2, 4 may be rotated horizontally about the vertical rotary shaft 24 by the rotation of the servo-motor 29. Because the first reflector assembly 1 is operatively interlocked with the second reflector assembly 3, the parallel sunbeams which have been reflected by the second reflector assembly and then refracted and highly condensed by the second refractor 4 are parallel with the original incoming sunrays. Therefore, as the angle of elevation of the sun varies from time to time the angle of incidence of the parallel light beams which are refracted by the second refractor 4 and consequently highly condensed thereby relative to the horizontal plane varies from time to time, as well. For this reason, it is generally inconvenient to utilize the highly condensed parallel light beams without some particular device. In the present invention, the following means is provided to eliminate the above-mentioned disadvantage.

Stating in brief, a first flat or plane reflector 30 is located immediately below the second refractor 4 and at an angle of inclination relative to the parallel light beams refracted by the second refractor 4. The first flat mirror 30 is fixedly secured to a rotary shaft 31 which extends in alignment with the horizontal rotary shafts 22, 22 and which is rotatably supported by the support frame 23. This rotary shaft 31 is connected through a gear train 32 having a reduction ratio of ½ to the aforementioned horizontal rotary shafts 22, 22 so that the first flat reflector 30 may turn at an angular velocity which is half of that of the first reflector assembly 1. Such arrangement enables the light beams reflected by the first flat reflector 30 to be directed horizontally at all times.

Figure 4:
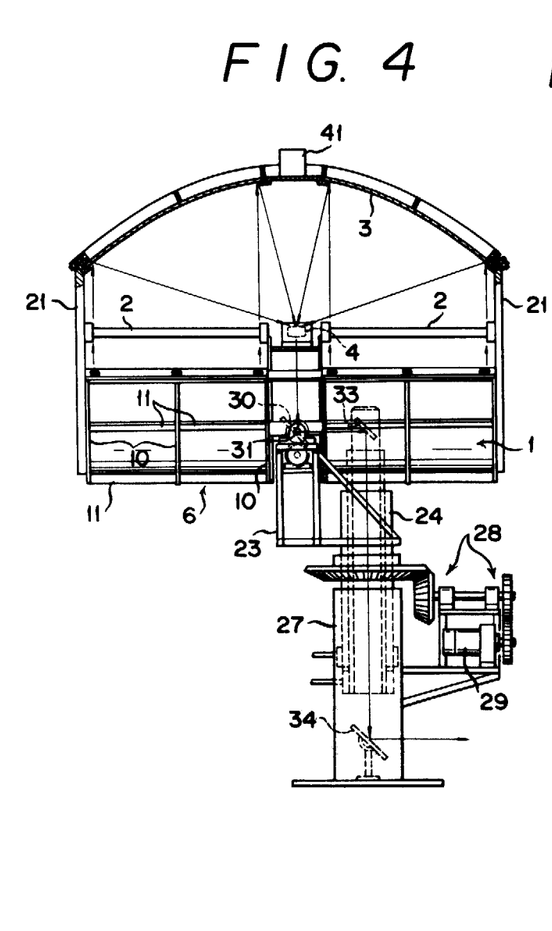
FIG. 4 is a front elevational view of the apparatus shown in FIG. 2.
Figure 5:
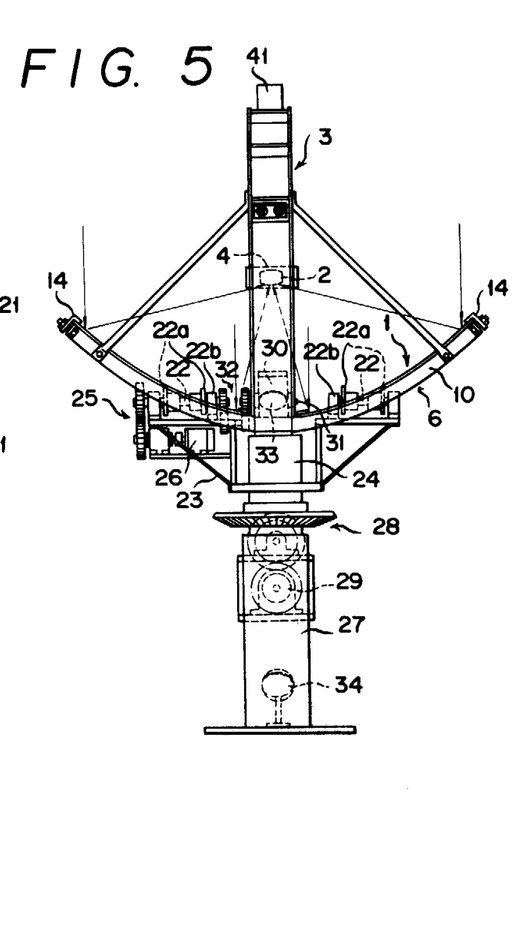
FIG. 5 is a side elevational view thereof.
Figure 6:
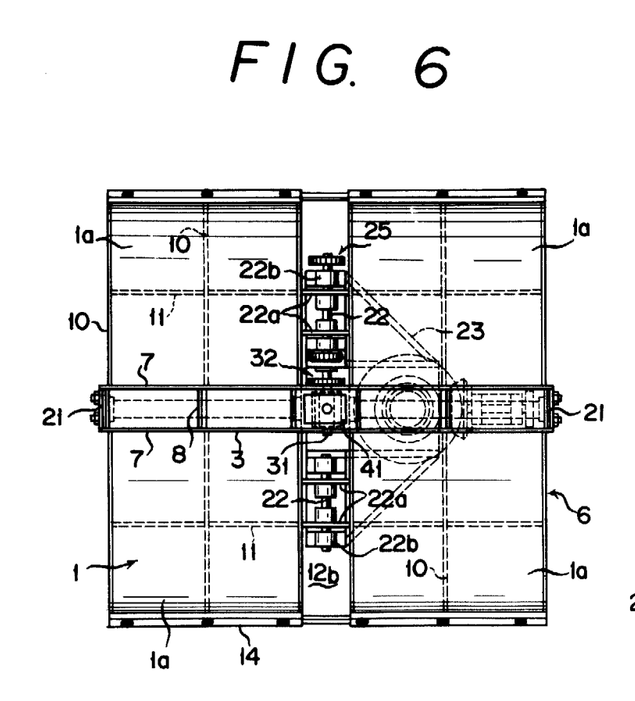
FIG. 6 is a top plan view thereof.
Figures 10, 11:
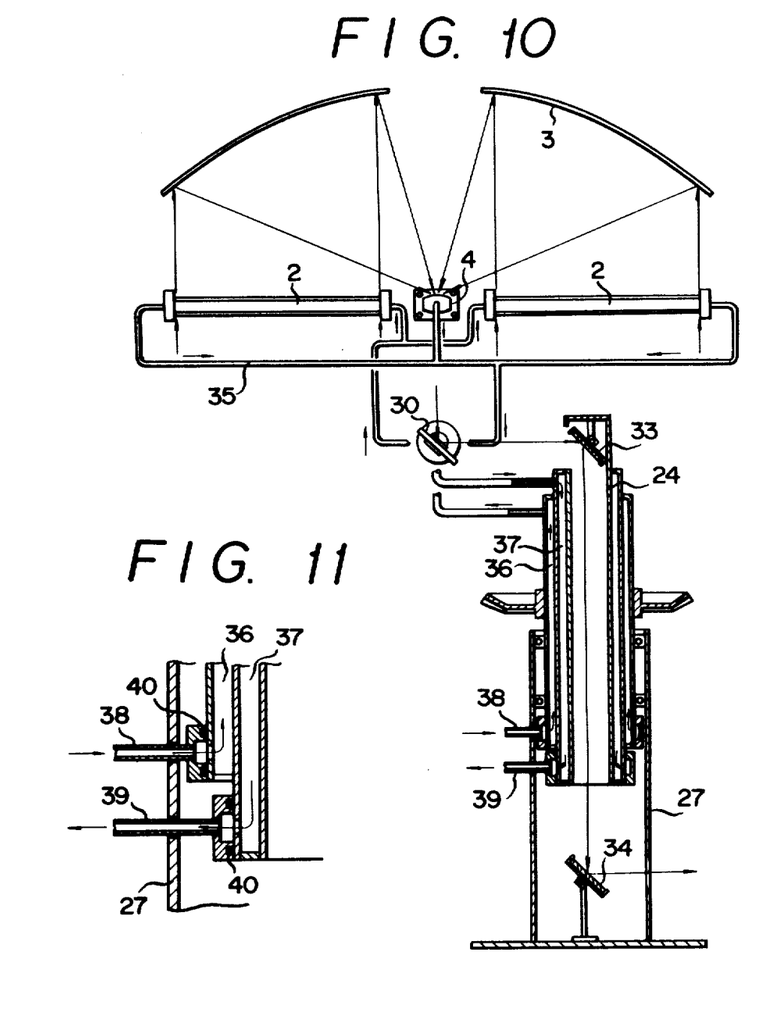
FIG. 10 is a view partly in cross-section explanatory of fluid path for hollow refractors.
FIG. 11 is an enlarged cross-sectional view showing rotary coupling portions in detail.

The vertical rotary shaft 24 projects at a position transversely offset from the center of the first reflector assembly 1. The vertical rotary shaft 24 has, as shown in FIGS. 4 and 10, a second flat or plane reflector 33 mounted inside of the leading end thereof at an angle of inclination of 45° and facing to the first flat reflector 30. Further, at the lower part of the vertical stationary shaft 27 supporting the vertical rotary shaft 24, a third flat or plane reflector 34 is mounted facing to the second flat reflector 33 and at an angle of inclination of 45°. The optical path for sunrays is thus formed by the flat reflectors 30, 33 and 34.

By adjusting the angle and the direction of the third flat reflector 34, it becomes possible to take out parallel sunrays highly condensed or focused at a desired spot or place. Therefore, if the device for utilizing sunrays is installed in such a place, sunrays can be effectively utilized.

Figure 9:
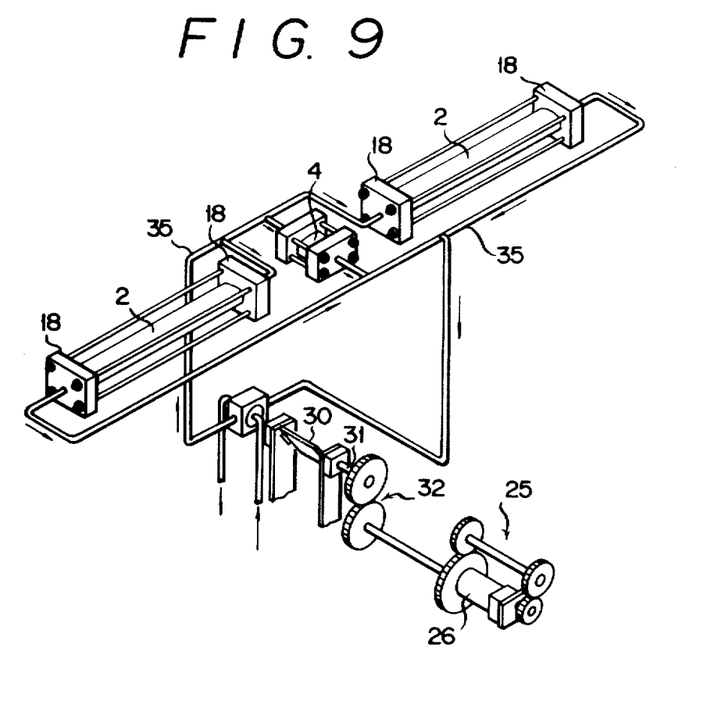
FIG. 9 is a perspective view explanatory of fluid path for hollow refractors and a drive connection for a first flat mirror.

Since the first and second refractors or lenses 2 and 4 are each formed by a hollow transparent member as can be seen from FIGS. 7 and 8 and each of the hollow portions is filled with cooling water (which should desirably be pure water). As shown in FIG. 9, the cooling water is arranged to circulate through a pipeline 35 connected to the fluid communication ports 20 formed in both ends of each of the refractors 2, 4.

As shown in FIG. 10, the pipeline 35 is connected with passages 36 and 37 which are concentrically formed between the vertical rotary shaft 24 and the vertical stationary shaft 27 supporting the shaft 24 and is also connected with an inlet pipe 38 and an outlet pipe 39 mounted on the vertical stationary shaft 27. Further, the inlet pipe 38 and the outlet pipe 39 are connected with the cylindrical passages 36 and 37, respectively, by means of rotary couplings which are of a water tight structure using "O" rings 40 as shown in FIG. 11.

In the drawings, reference numeral 41 denotes a sun tracking or following means adapted to direct the first reflector assembly 1 to the sun at all times. The sun following means 41 is arranged to locate the optical axis of the first reflector assembly 1 vertically and thereafter render it inoperative for a pretermined time after the sun sets or where the time in which the amount of sunrays is less than a predetermined value is longer than a pretermined time and when the velocity of the wind then prevailing is more than a predetermined value. The sun tracking device will now be described in detail referring to FIGS. 12 to 14 inclusive.

Figure 12:
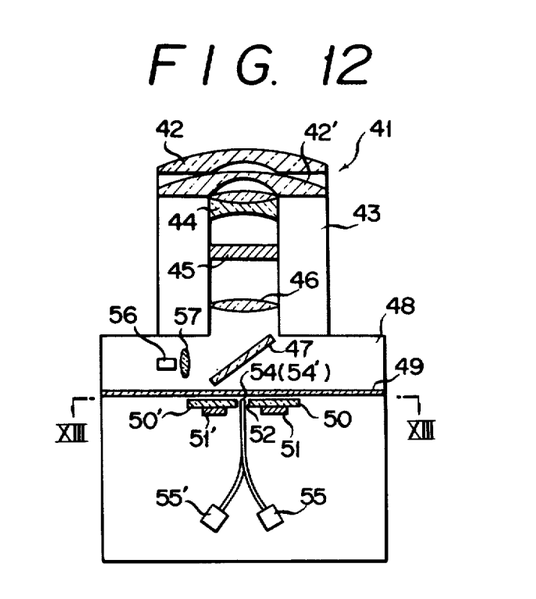
FIG. 12 is a schematical longitudinal cross-sectional view of a sun tracking device.

In FIG. 12, reference numerals 42 and 42' denote fish eye lenses laid one upon another on the top of a cylindrical member 43 and having the field of view of 180° which covers the entire incidence angle of the sunlight when the optical axis of the first reflector 1 is disposed vertically. Since the optical axis of the first reflector 1 is disposed vertically at the time of sunrise on a day, the incoming light is refracted by the fish eye lenses 42, 42' and reaches a condensing lens 44 positioned below the lower concavo-convex lens 42' within the cylindrical member 43. The light is further refracted by the condensing lens 44 and passes through a filter 45 positioned below the focusing lens 44 within the cylindrical member 43 to adjust the intensity of the light. After the intensity adjustment, the light passes through an image formation adjusting lens 46 positioned below the filter 45 within the cylindrical member 43 and then through a semi-transmissive glass 47 provided at the lower end edge of the cylindrical member 43 to a screen glass 49 provided within a casing 48 positioned under the cylindrical member 43 and forms an image on the screen glass 49.

Diffusion glasses 50, 50' are provided on the undersurface of the screen glass 49 in the center thereof. Having passed through the screen 49, the light is diffused by either the diffusion glass 50 or 50' and strikes on either one of photosensitive cells 51 and 51' provided on the undersurface of the diffusion glasses 50, 50' respectively. The periphery of the diffusion glasses 50, 50' is preferably coated with a reflective material which reflects the light into the interior of the diffusion glasses. Since the photosensitive cell 51 or 51' senses the light regardless of the position of the area of the associated diffusion glass 50 or 50' where the light strikes, the size of the photosensitive cells 51, 51' is not required to be large enough to cover the entire image forming area and therefore the photosensitive cells 51, 51' may be of small size. Furthermore, each of the photosensitive cells may be formed by a single element.

The photosensitive cell 51 is designed to operate a switch which is adapted to rotate the vertical rotary shaft 24 in the clockwise direction to operate the servomotor 29 whereas the photosensitive cell 51' is adapted to operate a switch which is adapted to rotate the vertical rotary shaft 24 in the counter-clockwise direction. The width of the slit 52 defined between the diffusion glasses 50, 50' is such an extent that the angular deviation of the optical axis of the first reflector 1 with respect to the optical axis of the sunlight can be maintained within a suitable range (±1°, for example) and thus, the control electric circuit is so arranged that so long as the formed image is positioned within the slit 52, the vertical rotary shaft 24 remains stationary and if the formed image displaces from the slit 52, the photosensitive cell 51 or 51' senses such displacement and rotates the motor whereby the formed image always enters the slit 52 and remains there. The motor ceases its rotation with the angular deviation of the optical axis of the first reflector 1 with respect to the optical axis of the sunlight maintained within the suitable range (±1°, for example). Thus, the sunlight focusing apparatus also ceases its rotation.

Since the intensity of the sunlight on the image forming surface of the screen glass 49 varies depending upon the magnitude of the angular deviation of the optical axis of the first reflector 1 with respect to that of the sunlight, it is desirable to design the filter 45 so that the light amount is increased in the central area of the filter and decreased in the peripheral area thereof whereby the intensity of illumination of the image formed on the screen glass 49 is made substantially the same throughout the image.

Figure 13:
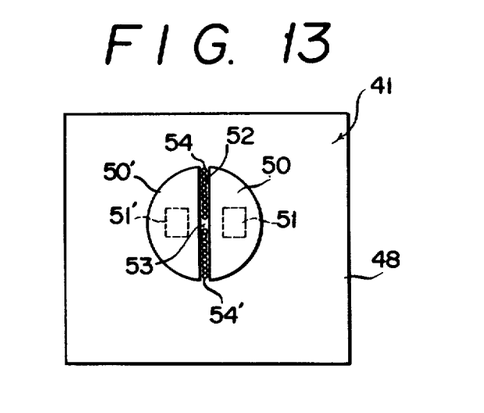
FIG. 13 is a view taken along the line VIII—VIII of FIG. 12.

In connection with the horizontal rotary shafts 22, optical fibers 54, 54' are inserted in the slit 52 so as to leave a clearance 53 which may be a suitable shape such as square or circular between the optical fiber bundles 54, 54' and the other ends of the optical fibers have photosensitive cells 55, 55', secured thereto, respectively. When the formed image is positioned on the photosensitive cell 55, the motor 26 is actuated to rotate the horizontal shafts 22 so as to increase the angle of elevation of the first reflector optical axis. When the formed image is positioned on the photo cell 55', the motor 26 is actuated so as to decrease the angle of elevation of the first reflector optical axis. When the formed image moves from the photosensitive cell 55 or 55' to the clearance 53, the rotation of the motor 26 is terminated. Since the formed image remains within the slit 52 at this time, the vertical rotary shaft 24 remains stationary. In the drawings, reference numeral 56 denotes a light quantity detection photosensitive sensor and 57 denotes a condensing lens.

Figure 14:
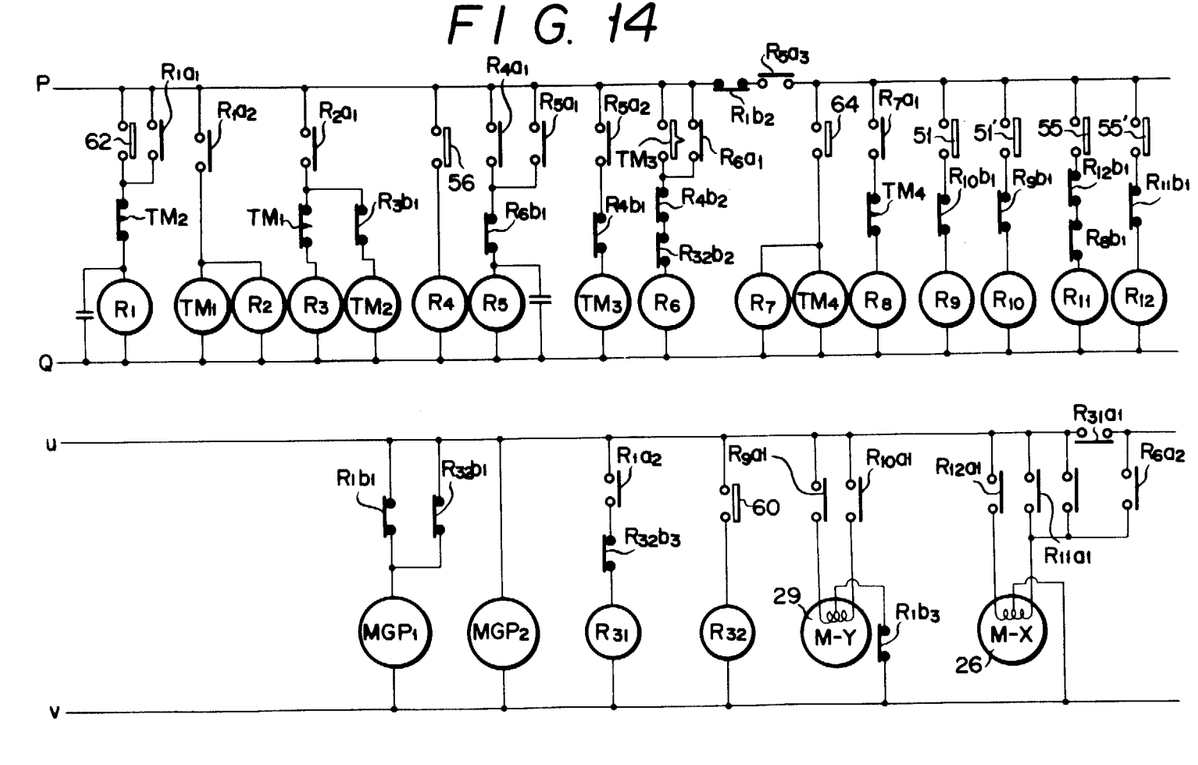
FIG. 14 is a control circuit for the sun tracking device.

FIG. 14 is a diagram showing the control sequence of the system and in which, with the lines P and Q applied a DC voltage thereto and the lines u and v applied an AC voltage thereto, when the photosensitive sensor 56 is actuated, the relay $R_4$ operates momentarily and the relay $R_5$ then operates and maintains the operation condition. At this time, the relay contact $R_{5a3}$ is closed turning a control circuit for the vertical rotary shaft drive motor 29 and horizontal rotary shaft drive motor 26 on, and a control circuit comprises the relays $R_7$–$R_{12}$ and timer $TM_4$ is also turned on. The circuit of the photosensitive cell 51 comprises the relay $R_9$ and the circuit of the photosensitive cell 51' comprises the relay $R_{10}$. These circuits of the photosensitive cells 51, 51' are interlocked at the normally closed contact b. The circuit of the photosensitive cell 55 comprises the relay $R_{11}$ and the circuit of the photosensitive cell 55' comprises the relay $R_{12}$. These circuits of the photosensitive cells 55, 55' are similarly interlocked at the normally closed contact b. When the photosensitive sensor 56 is turned off when the sun sets or hides itself behind the cloud, for example, the timer $TM_3$ is turned on. If the photosensitive sensor 56 turns on before the time set for the timer $TM_3$ elapses when the cloud rolls away, for example, the timer $TM_3$ is reset. When the time set for the timer $TM_3$ elapses, a relay $R_6$ is operated and maintains the operative condition and the relay $R_5$ is reset. Thus, the horizontal rotary shaft drive motor 26 rotates in the forward direction to increase the angle of elevation of the first reflector 1 until the angle becomes the vertical whereupon the sensor 60 which is adapted to detect the angle of elevation is operated to set the relay $R_6$.

Next, description will be made of events which occur when the wind force sensor 62 operates. When the wind force sensor 62 operates, the relay $R_1$ is operated and maintains the operative condition and the timer $TM_1$, relay $R_2$, relay $R_3$ and relay $R_{31}$ operate In the same manner as when the light sensor 56 turns off, when the relay contact $R_{31a1}$ is closed, the horizontal rotary shaft drive motor 26 is rotated in the forward direction so as to increase the angle of elevation of the first reflector 1 until the angle of elevation becomes vertical whereupon the angle of elevation detection sensor 60 operates (the sensor 60 has been already operated and maintains the operative condition during the night hours and the sun is hiding itself behind the cloud). Therefore, the magnet plunger $MGP_1$ for the vertical rotary shaft clutch is unclutched by the AND circuit of the relays $R_{32}$ and $R_1$ and the vertical rotary shaft is mechanically released. The relay contacts $R_{1b2}$ and $R_{1b3}$ are interlocked for the sake of safety and the relay $R_3$ and timer $TM_2$ are for the circuit resetting.

When supply of electric current is interrupted, the magnet plunger $MGP_1$ for the vertical rotary shaft clutch is unclutched and at the same time, the magnet plunger $MGP_2$ for the horizontal rotary shaft clutch is also unclutched to cope with high wind under electric current supply interruption condition.

Furthermore, when the magnet plunger $MGP_1$ for the vertical rotary shaft clutch is unclutched under the force of high wind and the first reflector 1 remains in a position deviated by 180° with respect to the optical axis of the sunlight at the time when the operator intends to return the first reflector 1 to its normal position, though such deviation occurs quite rarely, the horizontal rotary shaft drive motor 26 may rotate in the reverse direction. In order to prevent such rotation of the motor 26, a reverse direction rotation prevention circuit is provided and the circuit comprises a limit switch 64 for controlling the angle of elevation of the first reflector 1, the relay $R_7$, the relay $R_8$ and the timer $TM_4$.

With the above mentioned construction and arrangement of the components of the sun tracking device, when the initial position of the optical axis of the first reflector is assumed as being the vertical, the first reflector can always track the moving sun. However, when the cloud rolls away after the sun has hidden itself behind the cloud for a long time period, the sunlight may shine on the back of the first reflector and both the vertical and horizontal rotary shafts may not operate properly. Under high wind weather conditions over such as 10 m/sec., the optical axis of the first reflector is maintained vertical and the vertical rotary shaft is left to rotate freely so as to present a minimum area of the first reflector in the direction of the wind to thereby allow the first reflector to rotate freely and thus, when the velocity of the wind drops to a value below 10 m/sec., the first reflector may assume an unexpected orientation with respect to the optical axis of the sunlight. Keeping this in mind, in order that the single sun tracking device can cope with various different weather conditions, when the time period during which the light quantity is less than a predetermined value because the sun sets and hides itself behind the cloud extends a predetermined time length such as over 30 minutes and/or the wind velocity exceeds a predetermined value such as 10 m/sec., for example, the horizontal rotary shafts are rotated so as to orientate the optical axis of the first reflector vertically and only when the wind velocity exceeds the predetermined value referred to above, the electromagnet clutch for the vertical rotary shaft is disengaged to allow the shaft to rotate freely. The optical axis of the first reflector is maintained vertical by holding the reflector in position by the use of a suitable means such as a spring.

When the first reflector ceases to move with the optical axis of the first reflector deviated by 180° with respect to the optical axis of the sunlight as the wind velocity decreases, the vertical rotary shaft rotates in the direction opposite to the angle of elevation of the sun. In order to prevent such rotation of the vertical rotary shaft, limit switches are provided on the framework in a position slightly beyond the vertical of the optical axis of the first reflector and in a position at the angle of about 5° beyond the horizon of the reflector optical axis, respectively. When these limit switches are so designed that when the switches operate, the rotation of the horizontal rotary shafts is interrupted for a predetermined time period such as over five minutes, an image is formed in the sensor associated with the vertical rotary shaft to return the optical axis of the first reflector to the normal orientation whereby the horizontal rotary shafts rotate in the proper direction.

Since the present invention is constructed as, mentioned in detail hereinabove, when in operation, the first reflector assembly 1 is always directed to the sun by the action of the sun following means 41, and further, by tilting the flat or plane reflector 30 to follow the inclination of the first reflector assembly 1 relative to the horizontal axis at an angular velocity which is half of that of the first reflector assembly, sunrays focused in a pretermined direction can always be obtained through the array of flat reflectors 5. Further, if the angle of the flat reflector 34 is made variable, the angle of incidence of the focused light beams can be adjusted by adjusting the angle of the reflector mirror 34.

In the aforementioned embodiment, the array of flat reflectors 5 comprises three pieces of flat reflector mirrors. As the number of reflector mirrors used increases, the energy losses caused thereby will increase. Therefore the reflection factor of each reflector must be excellent. As for each of the reflectors, a highly polished copper plate having silver adhered thereto by vapor adsorption and having thin glass coating on the silver surfaces may be employed. Further, the back side of the each reflector is preferably cooled so as to avoid melting thereof when the degree of focusing of sunrays becomes high. The reflection factor of total energy by a flat or plane reflector mirror made of stainless steel is 92%, whilst those of flat reflectors made of aluminium and gold are 94 to 96%. Further, since the first reflector assembly 1 has a large surface area, it can be formed by stainless steel, and it is desirable to select materials having more excellent reflection factor as the focusing of sunrays increases. If a reflector mirror having silver vapor-adsorbed faces with glass coating about $2\mu$ thick is employed, an energy reflection factor of 96 to 97% can be obtained.

As described hereinabove, according to the sunrays focusing apparatus of the present invention, in case of utilizing sunrays, it is possible to obtain parallel light beams focused in a predetermined direction irrespective of the position of the sun, and further by the combination of the first reflector assembly 1, and the second reflector assembly 3 with the first refractors 2 and the second refractor 4, it is possible to focus the sunrays 1,000,000 times and more thereby enabling high temperatures to be obtained easily.

Further, when the apparatus of this invention is used in combination with a beam's wave-length convertor means to produce hydrogen and oxygen from water by the action of a photochemical cell, it becomes possible to manufacture the apparatus very simply. Further, if light beams are made free of wavelengths harmful to the growth of plants and then dispersed in a greenhouse in which sunrays are not allowed to enter directly, it becomes possible to form a greenhouse kept at high temperatures which cannot otherwise be attained.

The total efficiency of sunrays focusing apparatus according to the present invention is approximately as follows.

The efficiency of the first reflector assembly 1 is 0.96; the efficiency of the first refractors 2 is 0.91; the efficiency of the second reflector assembly 3 is 0.96; the efficiency of the second refractor 4 is 0.91; the efficiency of the flat or plane mirrors 30, 33 and 34 is 0.96; and the total efficiency is 0.68.

It is to be understood that the foregoing description is merely illustrative of a preferred embodiment of the invention, and that the scope of the invention is not to be limited thereto, but is to be determined by the scope of the appended claims.

What I claim is:

1. A sunrays focusing apparatus, comprising in combination:
   a first vertical shaft;
   a support frame rotatably mounted on said first vertical shaft;
   first drive means for rotating said support frame around said first vertical shaft; horizontal shaft means rotatably supported on said support frame;
   second drive means for rotating said horizontal shaft means;
   a first trough-shaped parabolic reflector means fixedly secured to said horizontal shaft means for reflecting incoming sunrays;
   first elongated refractor means mounted to said first reflector means at or adjacent to a focal axis of said first reflector means, said first elongated refractor means being adapted to refract sunrays reflected by said first parabolic reflector means into parallel sunrays;
   second trough-shaped parabolic reflector means mounted to said first parabolic reflector means in such a way that focal axes of both said first and second parabolic reflector means are disposed at right angles to each other;
   second refractor means mounted to said first parabolic reflector means at or adjacent to the focal axis of said second parabolic reflector means for refracting sunrays reflected by said second parabolic reflector means into highly condensed parallel sunrays; and sun tracking means responsive to sunrays for directing said first parabolic reflector means to the sun by controlling said first and second drive means.

2. A sunrays focusing apparatus according to claim 1 further comprising a horizontal rotary shaft mounted for rotation on said support frame, said horizontal rotary shaft being aligned with said horizontal shaft means, a first flat reflector mounted on said horizontal rotary shaft with such a inclination relative to said second refractor means as to reflect highly condensed parallel sunrays from said second refractor means in a horizontal direction; and means for operatively connecting said horizontal rotary shaft to said second drive means in such a way that the angular velocity of said horizontal rotary shaft becomes half of the angular velocity of said horizontal shaft means.

3. A sunrays focusing apparatus according to claim 2 further comprising a second vertical shaft rotatably mounted to said first vertical shaft and adapted to be driven by said first drive means, said second vertical shaft having said support frame fixedly secured thereto, a second flat reflector mounted to said second vertical shaft, and a third flat reflector mounted to said first vertical shaft, said first, second and third flat reflectors being arranged to form an optical path for the highly condensed parallel sunrays.

4. A sunrays focusing apparatus according to claim 1, 2 or 3 wherein each of said first and second refractor means is of hollow shaped construction and wherein said apparatus further comprises means for circulating fluid in said first and second hollow refractors.

5. A sunrays focusing apparatus according to claim 1 wherein said sun tracking means is mounted on said second parabolic reflector means.

* * * * *